US006294075B1

(12) United States Patent
Poggio et al.

(10) Patent No.: US 6,294,075 B1
(45) Date of Patent: Sep. 25, 2001

(54) METHOD OF CONTROLLING AND DIAGNOSING THE HEATER OF AN ENGINE EXHAUST GAS COMPOSITION SENSOR

(75) Inventors: Luca Poggio, Spinetta Marengo; Marco Secco, Nizza Monferrato; Daniele Ceccarini, Rimini, all of (IT)

(73) Assignee: Magneti Marelli S.p.A., Milan (IT)

( * ) Notice: Subject to any disclaimer, the term of this patent is extended or adjusted under 35 U.S.C. 154(b) by 0 days.

(21) Appl. No.: 09/499,430

(22) Filed: Feb. 7, 2000

(30) Foreign Application Priority Data

Feb. 9, 1999 (IT) ............................................ BO99A0052

(51) Int. Cl.[7] ................................................... G01N 27/407

(52) U.S. Cl. .......................... 205/785; 204/406; 204/408; 204/424; 123/697

(58) Field of Search ............................. 205/785; 204/406, 204/424–429, 408; 73/23.32; 123/697; 702/104

(56) References Cited

U.S. PATENT DOCUMENTS

| | | | |
|---|---|---|---|
| 5,148,795 | 9/1992 | Nagai et al. | 123/697 |
| 5,245,979 | 9/1993 | Pursifull et al. | 123/690 |
| 5,781,878 * | 7/1998 | Mizoguchi et al. | 701/109 |

FOREIGN PATENT DOCUMENTS

841562 A2 * 5/1998 (EP) .
2327271 1/1999 (GB) .

OTHER PUBLICATIONS

Patent Abstracts of Japan of JP 01158337 Dated Jun. 21, 1989.

Patent Abstracts of Japan of JP01172746 Dated Jul. 7, 1989.

* cited by examiner

*Primary Examiner*—Robert J. Warden, Sr.
*Assistant Examiner*—Kaj K. Olsen
(74) *Attorney, Agent, or Firm*—Ladas and Parry

(57) ABSTRACT

A method of controlling and diagnosing the heater of a sensor sensitive to the composition of the exhaust gas of an engine; the sensor having at least an electrolytic cell sensitive to oxygen ions, and supplying information relative to the ratio of the mixture supplied to the engine; the method including the steps of: calculating an internal resistance value of the cell on the basis of detected values of the voltage at the terminals of the cell before and after supplying a reference current to the cell; correcting the calculated internal resistance value as a function of the detected ratio of the mixture supplied to the engine; converting the corrected internal resistance value into a current temperature value of the sensor; feedback controlling the temperature of the sensor by regulating the current supplied to the heater by processing the deviation between the current temperature value and an objective temperature; and diagnosing the efficiency of the heater as of the corrected internal resistance value of the cell.

11 Claims, 3 Drawing Sheets

METHOD OF CONTROLLING AND DIAGNOSING THE HEATER OF AN ENGINE EXHAUST GAS COMPOSITION SENSOR

The present invention relates to a method of controlling and diagnosing the heater of an engine exhaust gas composition sensor.

BACKGROUND OF THE INVENTION

To determine the composition of the exhaust gas of an internal combustion engine, i.e. to obtain information concerning the ratio of the air/fuel mixture supplied to the cylinders, oxygen sensors and/or nitric oxide or hydrocarbon sensors are used along the engine exhaust pipe, up- and/or downstream from the catalytic converter.

All currently marketed sensors, whether they be linear oxygen (UEGO), on/off oxygen (lambda) or nitric oxide or hydrocarbon sensors, comprise a diffusion chamber for receiving part of the exhaust gas from the engine; a reference chamber containing a given percentage of oxygen; and an electrolytic (so-called Vs sensing) cell sensitive to oxygen ions and interposed between the diffusion and reference chambers. The electrolytic cell has two electrodes between which, in use, is present a voltage signal related to the difference between the oxygen percentages in the diffusion and reference chambers.

The voltage signal at the terminals of the electrolytic cell is processed to generate an output signal indicating the exhaust gas composition and, hence, the ratio of the mixture supplied to the engine.

To operate correctly, the temperature of such sensors must be maintained about a given optimum temperature value, which depends on the type and physical characteristics of the sensor.

To enable rapid heating of the sensor when cold starting the engine, and to maintain the temperature about the optimum value when the engine is running, each sensor has a respective heater (representable schematically by an electric resistor) current driven by a control device. Heater control devices provide for two functions: regulating the current supplied to the heater (to control the temperature of the sensor) and diagnosing the efficiency of the heater, to prevent any deterioration of the heater resulting in failure to maintain the temperature of the sensor about the optimum value, and the generation of spurious exhaust gas composition signals.

To control the temperature of the sensor, known control devices exploit the relationship between the temperature of the sensor and the internal resistance of the electrolytic cell. More specifically, known devices determine the differential voltage at the terminals of the electrolytic cell before and after supplying a reference current to the cell, and calculate the internal resistance by dividing the difference between the two differential voltages by the reference current. The calculated internal resistance value is then converted into the current temperature of the sensor using a memorized conversion table, and the current temperature is used in a feedback circuit for regulating the current supplied to the heater according to the difference between the current and optimum temperatures.

The heater is diagnosed by measuring the voltage drop at the terminals of a measuring resistor connected in series with the heater, i.e. by determining the current through the heater. More specifically, the heater is considered inefficient when the measured current values fail to fall within the efficiency range specified by the sensor manufacturer.

A major drawback of control devices of the type described above lies in the degree of accuracy with which the internal resistance of the electrolytic cell is measured.

That is, the internal resistance of the cell is measured applying Ohm's law as described above, regardless of the current state of the cell, i.e. regardless of the oxygen percentage of the gases in the diffusion chamber. Whereas, in actual fact, tests have shown the above method of determining internal resistance to result in fairly serious errors, on account of the effect on internal resistance of variations in the oxygen percentage in the diffusion chamber, and therefore in the ratio of the mixture supplied to the engine.

As a result, the current sensor temperature value indicated by known control devices differs significantly from the actual value, thus resulting in feedback circuit errors and possibly also, among other things, in impaired diagnosis.

SUMMARY OF THE INVENTION

It is an object of the present invention to provide a method of controlling and diagnosing the heater of an engine exhaust gas composition sensor, designed to eliminate the aforementioned drawback.

According to the present invention, there is provided a method of controlling and diagnosing the heater of a sensor sensitive to the composition of the exhaust gas of an engine as recited by claim 1.

This therefore provides for obtaining an extremely accurate internal resistance value of the cell, regardless of the oxygen percentage of the exhaust gas, and regardless, therefore, of when the current temperature of the sensor is determined. Reconstructing the current temperature of the sensor therefore provides for highly accurate results, improved feedback temperature control, and accurate diagnosis of the efficiency of the heater.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
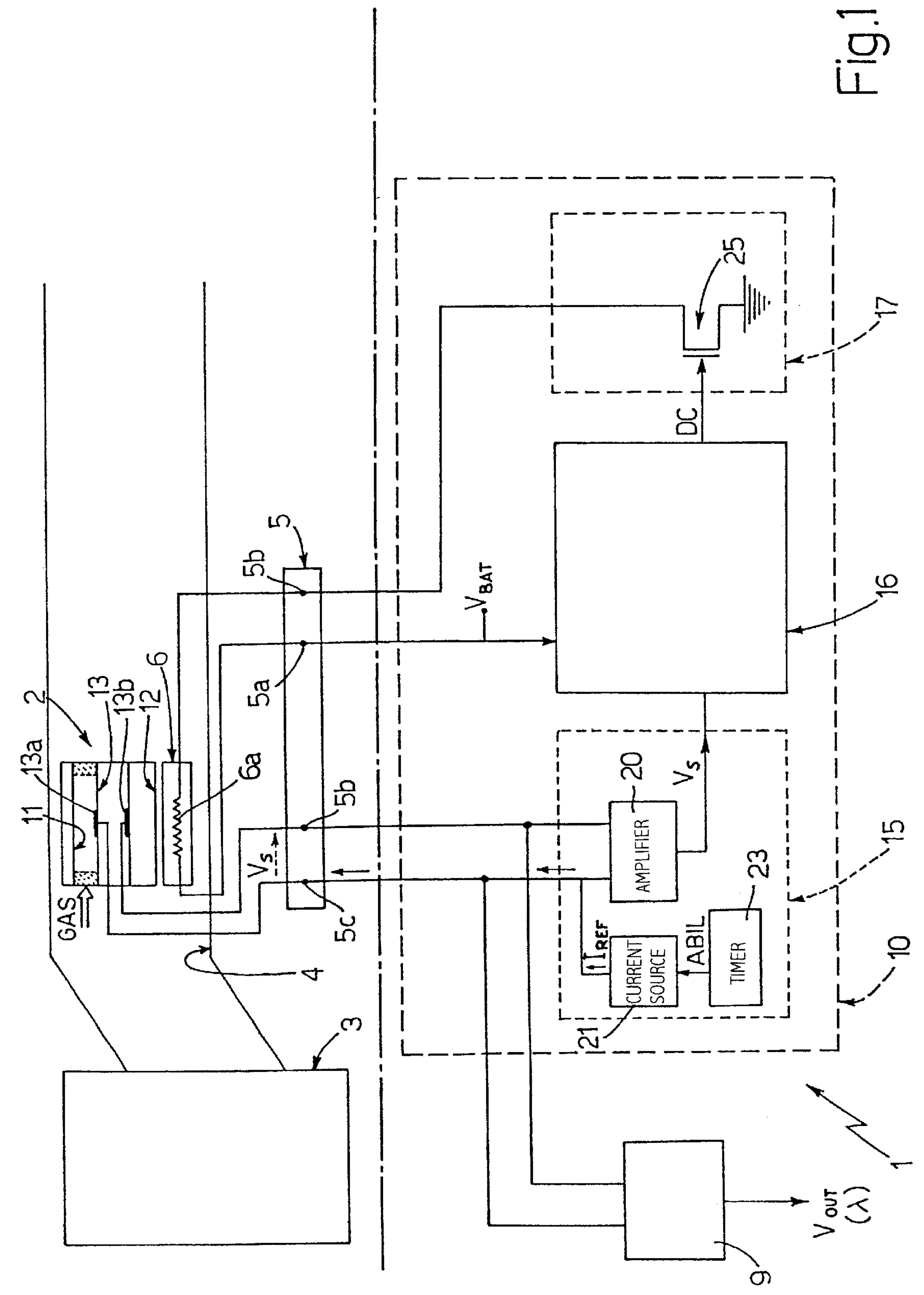
FIG. 1 shows, schematically, a control unit for controlling a sensor sensitive to the stoichiometric composition of engine exhaust gases.

Number 1 in FIG. 1 indicates as a whole a control unit for controlling a sensor 2 sensitive to the stoichiometric composition of the exhaust gas of an engine 3 (shown schematically).

Sensor 2 (of known type) is located along the exhaust pipe 4 of engine 3, down- and/or upstream from the catalyst (not shown), is connected to control unit 1 by a connector 51 and is controlled by unit 1 to supply information relative to the stoichiometric composition of the exhaust gas and, hence, the ratio of the air/fuel mixture supplied to engine 3.

Sensor 2 has a heater 6 shown schematically by an electric resistor 6*a* connected between two terminals 5*a* and 5*b* of connector 5, and which is current driven to heat sensor 2 when cold starting engine 3, and to maintain the temperature of sensor 2 about an optimum value when the engine is running.

Control unit 1 forms part of the electronic central unit controlling the engine, and comprises a device 9 cooperating with sensor 2 to generate a signal $V_{OUT}$ related to the stoichiometric composition of the exhaust gas and, hence to the ratio λ of the mixture supplied to engine 3.

Control unit 1 also comprises a device 10 for controlling and diagnosing heater 6 of sensor 2. Device implements the method according to the present invention, and provides for two functions: regulating the current supplied to heater 6 to feedback control the temperature of sensor 2; and performing a functional diagnosis of heater 6 to determine the efficiency or any deterioration of the heater.

Sensor 2 comprises a diffusion chamber 11 for receiving part of the exhaust gas; a reference chamber 12 containing a given percentage of oxygen; and an electrolytic (so-called Vs sensing) cell 13 sensitive to oxygen ions and interposed between chambers 11 and 12. Sensing cell 13 has two electrodes 13*a* and 13*b* connected to respective terminals 5*c* and 5*d* of connector 5, and generates between the electrodes a voltage signal Vs related to the difference between the oxygen percentages in diffusion and reference chambers 11 and 12.

In the FIG. 1 example, sensor 2 is defined by an ordinary on/off oxygen (so-called "lambda") sensor, to which the following description refers purely by way of example. In fact, for the purpose of the present invention, sensor 2 may also be defined by a linear oxygen (e.g. UEGO) sensor, or by a nitric oxide or hydrocarbon sensor, since, as is known, each comprises a heater and an electrolytic sensing cell interposed between a diffusion chamber and a reference chamber.

Device 9 is connected to terminals 5*c* and 5*d* of connector 5 to receive signal Vs at the terminals of sensing cell 13, and generates signal $V_{OUT}$ in known manner on the basis of a processing operation of signal Vs. In the example shown, seeing as sensor 2 is defined by a lambda sensor, signal $V_{OUT}$ is a two-value signal indicating a rich or lean ratio λ of the mixture supplied to the engine.

Control and diagnosis device 10 is substantially dividable into three functional blocks 15, 16 and 17. Block 15 defines an interface circuit interfacing with sensing cell 13 and for acquiring the value of the internal resistance RPVS of cell 13, which, as is known, is related to the temperature of sensor 2; block 17 defines an interface circuit interfacing with heater 6, and is controlled to regulate the current supplied to heater 6; and block 16 is a processing block, which cooperates with block 15 to determine the value of internal resistance RPVS of cell 13, implements feedback control of the temperature of sensor 2, controls block 17 to regulate the current supplied to heater 6 according to the control result, and provides for diagnosing the efficiency of heater 6.

More specifically, block 15 comprises a differential amplifier 20, the inputs of which are connected to terminals 5*c* and 5*d* of connector 5 (i.e. to electrodes 13*a* and 13*b*) to receive signal Vs at the terminals of sensing cell 13, and the output of which is supplied to processing block 16. Block 15 also comprises a known current source 21, which is connected to electrode 13*a* to supply a reference current $I_{REF}$ to cell 13 when commanded by an enabling signal ABIL; and a timing circuit 23 for generating enabling signal ABIL to time control supply of reference current $I_{REF}$ to cell 13 and so synchronize the operations for determining internal resistance RPVS.

In block 17 interfacing with heater 6, terminal 5*a* of connector 5 (i.e. one terminal of resistor 6*a*) is connected to a supply voltage $V_{BAT}$, while terminal 5*b* (i.e. the other terminal of resistor 6*a*) is grounded by a power transistor 25, which is controlled by an output signal DC from processing block 16 to disable and/or command current flow through heater 6. Duty cycle control of transistor 25 therefore provides for regulating current flow through resistor 6*a* to ground and, hence, the heating action of sensor 2.

Processing block 16 will now be described with reference to FIG. 2.

Block 16 comprises a memorizing and calculating block 27 for receiving and memorizing signal Vs amplified by amplifier 20, and for calculating internal resistance RPVS of cell 13.

Figure 3:
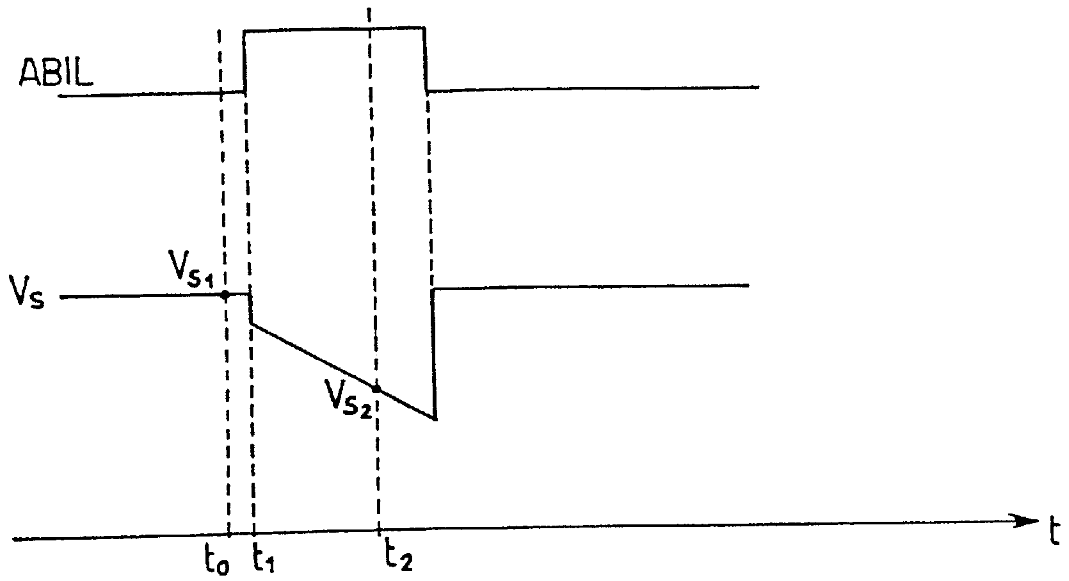
FIG. 3 shows a time graph of a control signal generated by the control device, and a signal representing the voltage at the terminals of the sensing electrolytic cell of the sensor.

More specifically, the operations by which to calculate internal resistance RPVS involve, firstly, memorizing the value $Vs_1$ of signal Vs at instant $t_0$ (FIG. 3) immediately preceding instant $t_1$ at which timing circuit 23, by switching signal ABIL, enables supply of reference current $I_{REF}$ to cell 13 by current source 21.

Following supply of reference current $I_{REF}$ to cell 13, signal Vs, i.e. the voltage between electrodes 13*a* and 13*b*, begins to vary (FIG. 3) due to disturbance of the state of the electrolytic cell.

At a next instant $t_2$, block 27 memorizes the value $Vs_2$ of signal Vs from differential amplifier 20, i.e. the amplified voltage at the terminals of sensing cell 13. The time interval between instants $t_1$ and $t_2$ is a calibration variable programmable according to the type of sensor 2.

Given the memorized values $Vs_1$ and $Vs_2$ of signal Vs (i.e. the voltage values at the terminals of cell 13 before and after reference current $I_{REF}$ is supplied), and given the value of reference current $I_{REF}$, block 27 calculates internal resistance RPVS of cell 13 according to the equation:

$$RPVS = \frac{Vs_1 - Vs_2}{I_{REF}}$$

where the voltage difference $Vs_1-Vs_2$ represents the voltage at the terminals of cell 13 due to reference current $I_{REF}$.

The output of block 27 therefore gives the value of internal resistance RPVS of cell 13.

According to the present invention, the output of block 27 is connected to a correction block 28 (FIG. 2) for correcting the value of internal resistance RPVS on the basis of a parameter $K_\lambda$ depending on the ratio λ of the mixture supplied to the engine. The correction in block 28 provides for ensuring the corrected value $RPVS_c$ represents the actual internal resistance of cell 13, by taking into account the operating conditions of sensor 2, i.e. the stoichiometric composition of the exhaust gas and, hence, ratio λ.

In other words, the purpose of parameter $K_{80}$ is to take into account any variations in the internal resistance of cell 13 caused by the oxygen concentration in diffusion chamber 11.

Figure 2:
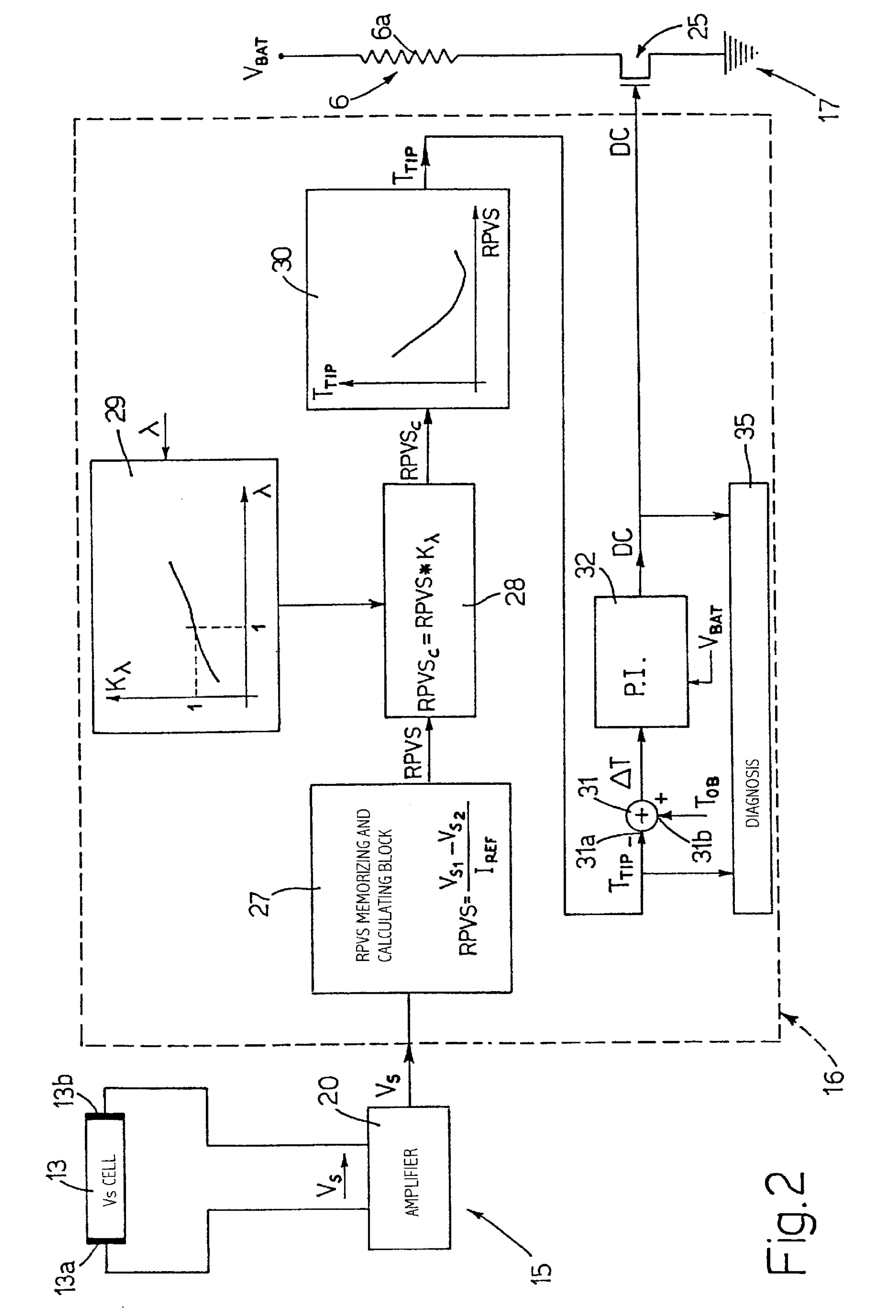
FIG. 2 shows a schematic block diagram of a device for controlling and diagnosing the heater of the sensor and implementing the method according to the present invention.

As shown in FIG. 2, block 28 makes the correction by multiplying the value of internal resistance RPVS from block 27 by parameter $K_\lambda$, according to the equation:

$$RPVS_c = RPVS \cdot k_\lambda$$

where the value of parameter $K_\lambda$ is obtained from the output of an electronic table 29 in which the parameter is expressed as a curve as a function of ratio λ.

As explained later on, the curve of parameter $K_\lambda$ as a function of ratio λ (i.e. the content of electronic table 29) is determined experimentally using a specimen sensor with the same physical and construction characteristics as sensor 2.

Electronic table 29 therefore supplies the value of parameter $K_\lambda$ according to the value of ratio λ received at the input, which input value is defined either by the last detected ratio value, or by the last estimated value available in the central control unit.

The corrected internal resistance value $RPVS_c$ is supplied to a known conversion table 30 for converting internal resistance $RPVS_c$ into the current temperature value $T_{TIP}$ of sensor 2. Conversion table 30 is normally supplied by the maker of sensor 2, and obviously differs according to the type and the physical and construction characteristics of the sensor.

To determine the correction parameter $K_\lambda$ curve (i.e. the content of electronic table 29), a specimen sensor with the same characteristics as sensor 2 is equipped with a temperature sensor for detecting the temperature of the sensor directly. For each ratio λ value, a corresponding correction parameter $K_\lambda$ value is obtained on the basis of the difference between the directly detected temperature and the temperature reconstructed indirectly by conversion table 30 from the internal resistance RPVS from block 27.

Figure 4:
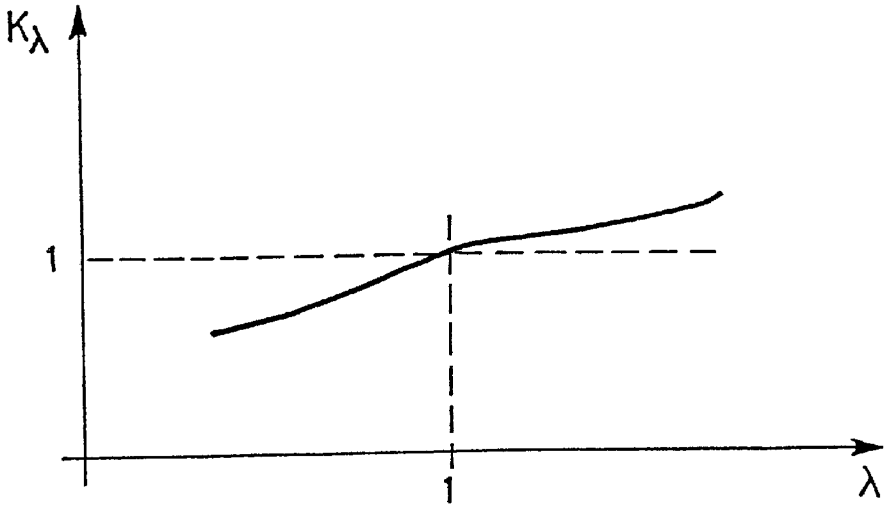
FIG. 4 shows a graph of a correction parameter used in a functional block of the FIG. 2 device.

In the example shown (FIGS. 2, 4), parameter $K_\lambda$ assumes a unit value when the oxygen concentration in diffusion chamber 11 equals that of exhaust gases originating from a stoichiometric mixture (λ=1), and assumes values below or above unit value when the ratio is below or above unit value respectively.

At the output of conversion table 30, the current temperature value $T_{TIP}$ of sensor 2 is supplied to a subtracting input 31*a* of an adding node 31, which also comprises an adding input 31*b*, which is supplied with an objective temperature value $T_{OB}$ defining the set point for the feedback control circuit.

Adding node 31 supplies at the output a parameter ΔT indicating the temperature error and defined by the difference between objective temperature $T_{OB}$ and the detected temperature $T_{TIP}$.

Error parameter ΔT is then supplied to a processing block 32 for generating the duty cycle signal DC by which to turn power transistor 25 on and off and so supply current to heater 6.

In the example embodiment shown, processing block 32 generates signal DC on the basis of proportional-integral (P.I.) processing of error parameter ΔT, and also takes into account any variations in supply voltage $V_{BAT}$.

That is, block 32 generates signal DC according to the following discrete equation:

$$DC(n) = [DC(n-1) + Kp\cdot(\Delta T(n) - \Delta T(n-1)) + Ki\cdot\Delta T(n)]\cdot\frac{Vbat_{MIS}}{Vbat_{NOM}}$$

where n is the current instant; Kp and Ki are calibratable constants; and $V_{BATMIS}$ and $V_{BATNOM}$ respectively define the detected value and the nominal value of supply voltage $V_{BAT}$.

Within a time cycle, the percentage of time transistor 25 is active is maintained within two given limit values DCmax and DCmin defining the maximum and minimum duty cycle values, and which vary according to the temperature of sensor 2 and/or the time interval from the instant in which heater 6 is driven to heat sensor 2.

This completes the feedback loop for temperature controlling sensor 2.

Block 16 in FIG. 2 also comprises a diagnosis block 35 for diagnosing the efficiency of heater 6 on the basis of reconstructed temperature value $T_{TIP}$ and duty cycle signal DC.

The operating principle of diagnosis block 35 is as follows.

When sensor 2 is operative, i.e. when temperature $T_{TIP}$ exceeds a given threshold value, and, despite heater 6 being supplied with maximum current (i.e. DCmax duty cycle) for a given time interval, temperature $T_{TIP}$ remains below a given minimum threshold $T_{SOGLMIN}$, this means the heat energy produced by heater 6 is not sufficient to heat sensor 2.

Conversely, if temperature $T_{TIP}$ of the sensor remains above a given maximum threshold $T_{SOGLMAX}$, despite heater 6 being supplied with minimum current (i.e. DCmin duty cycle) for a given time interval, this means the heat energy produced by heater 6 to heat sensor 2 is too high.

In both the above situations, a problem on heater 6 is diagnosed and transistor 25 is turned off for a given length of time, after which, feedback control as described above is re-enabled to perform another diagnosis.

In the event a problem on heater 6 is diagnosed a given number of consecutive times, transistor 25 is finally turned off altogether, and heater 6 indicated inefficient.

The control and diagnosis method described above affords considerable advantages as compared with known control methods.

In particular, the temperature of sensor 2 is determined extremely accurately, regardless of the oxygen concentration in diffusion chamber 11, thus resulting in far more accurate temperature control of the sensor, and far more reliable diagnosis of the efficiency of the heater.

Secondly, the heater is diagnosed with no need for a measuring resistor connected in series with the heater. Apart from saving money (considering the cost of a high-power measuring resistor), this prevents any variations in measuring resistance from invalidating the diagnosis, or the inevitable dispersions introduced by the measuring resistor from affecting the diagnosis result.

What is claimed is:

1. A method of controlling and diagnosing a heater of a sensor sensitive to the composition of the exhaust gas of an engine; said method comprising the steps of:

- providing a sensor with a heater, the sensor comprising at least an electrolytic cell, which has two terminals and is sensitive to oxygen ions;
- measuring an air to fuel ratio (λ) of the mixture supplied to the engine by means of said sensor;
- calculating an internal resistance value (RPVS) of the cell on the basis of detected values of voltage at the terminals of the cell before supplying a reference current ($I_{REF}$) to the cell and after a predetermined amount of time from the supplying of said reference current ($I_{REF}$);
- calculating a corrected internal resistance value ($RPVS_c$) of the cell according to the measured air to fuel ratio (λ);
- converting the corrected internal resistance value ($RPVS_c$) into a current temperature value ($T_{TIP}$) of the sensor;
- feedback controlling the temperature of the sensor by regulating the current supplied to the heater by processing any deviation (ΔT) between said current temperature value ($T_{TIP}$) and an objective temperature ($T_{OB}$); and
- diagnosing efficiency of the heater by comparing said current temperature value ($T_{TIP}$) with at least one predetermined value ($T_{SOGLMIN}$, $T_{SOGLMAX}$).

2. The method as claimed in claim 1, wherein said step of calculating the internal resistance value (RPVS) comprises the substeps of:

memorizing a first value ($Vs_1$) of the voltage at the terminals of the cell before supplying the reference current ($I_{REF}$) to the cell;

supplying the reference current ($I_{REF}$) to the cell;

memorizing a second value ($Vs_2$) of the voltage at the terminals of the cell after supplying the reference current ($I_{REF}$) to the cell; and dividing a difference between the memorized first ($Vs_1$) and second ($Vs_2$) values of the voltage at the terminals of the cell by the value of the reference current ($I_{REF}$).

3. A method as claimed in claim 1, wherein said correcting step is performed by multiplying the calculated internal resistance value (RPVS) by a correction parameter ($K_\lambda$) depending on said measured air to fuel ratio ($\lambda$) of the mixture supplied to the engine, so as to take into account the current oxygen concentration of the exhaust gas.

4. A method as claimed in claim 3, wherein said correction parameter ($K_\lambda$) is obtained from the output of an electronic table expressing the correction parameter ($K_\lambda$) as a curve as a function of said measured air to fuel ratio ($\lambda$) of the mixture supplied to the engine; the electronic table supplying the correction parameter ($K_\lambda$) on the basis of the last ratio ($\lambda$) value calculated in the central control unit controlling the engine.

5. A method as claimed in claim 4, wherein said electronic table expressing said correction parameter ($K_\lambda$) as a curve as a function of said air to fuel ratio ($\lambda$) is memorized in the central control unit controlling the engine; said curve of the correction parameter ($K_\lambda$) being obtained using a specimen sensor having the same physical and construction characteristics as said sensor and having a temperature sensor; the value of the correction parameter ($K_\lambda$) corresponding to each said measured air to fuel ratio ($\lambda$) value being obtained by comparing the temperature measured directly by the temperature sensor and the temperature value reconstructed indirectly by measuring the internal resistance of the electrolytic cell of the specimen sensor.

6. A method as claimed in claim 3, wherein said electronic table expressing said correction parameter ($K_\lambda$) as a curve as a function of said air to fuel ratio ($\lambda$) is memorized in the central control unit controlling the engine; said curve of the correction parameter ($K_\lambda$) being obtained using a specimen sensor having the same physical and construction characteristics as said sensor and having a temperature sensor; the value of the correction parameter ($K_\lambda$) corresponding to each said measured air to fuel ratio ($\lambda$) value being obtained by comparing the temperature measured directly by the temperature sensor and the temperature value reconstructed indirectly by measuring the internal resistance of the electrolytic cell of the specimen sensor.

7. A method as claimed in claim 1, wherein said step of feedback controlling the temperature of said sensor comprises the substeps of:

processing said deviation ($\Delta T$) between the current temperature value ($T_{TIP}$) and the objective temperature ($T_{OB}$) of the sensor.

generating, on the basis of the result of said processing, a control signal (DC) for controlling a power resistor connected to the heater and which, as a function of the control signal (DC), disables and/or commands electric current flow through the heater.

8. A method as claimed in claim 7, wherein said control signal (DC) is a duty cycle signal obtained by proportional-integral processing of said deviation ($\Delta T$) between the current temperature value ($T_{TIP}$) and the objective temperature ($T_{OB}$) of the sensor.

9. A method as claimed in claim 7, wherein said step of diagnosing the efficiency of the heater is performed as of the current temperature value ($T_{TIP}$) of the sensor and from the percentage of time in which, within a time cycle, the power transistor is active to command current flow through the heater; said percentage of time being maintained within a range defined by a minimum threshold value (DCmin) and a maximum threshold value (DCmax).

10. A method as claimed in claim 9, wherein the step of diagnosing comprises the substeps of:

checking whether the current temperature value ($T_{TIP}$) of the sensor exceeds a minimum threshold temperature ($T_{SOGLMIN}$) when the time percentage in which the transistor is active is maintained equal to the maximum threshold value (DCmax) for a given time interval;

performing said checking a given number of consecutive times, in a given number of consecutive time intervals;

indicating inefficiency of the heater in the event the result of said checking is always negative.

11. A method as claimed in claim 10, wherein the step of diagnosing also comprises the substeps of:

checking whether the current temperature value ($T_{TIP}$) of the sensor is below a maximum threshold temperature ($T_{SOGLMAX}$) of the sensor when the percentage of time in which the transistor is active is maintained equal to the minimum threshold value (DCmin) for a given time interval;

performing said checking a given number of consecutive times, in a given number of consecutive time intervals;

indicating inefficiency of the heater in the event the result of said checking is always negative.

* * * * *